(12) United States Patent
Wendling (10) Patent No.: US 9,022,052 B2
(45) Date of Patent: May 5, 2015

(54) STANDPIPE EMERGENCY BYPASS METHOD AND KIT FOR FIREFIGHTERS

(76) Inventor: James Robert Wendling, Larchmont, NY (US)

(*) Notice: Subject to any disclaimer, the term of this patent is extended or adjusted under 35 U.S.C. 154(b) by 977 days.

(21) Appl. No.: 13/162,700

(22) Filed: Jun. 17, 2011

(65) Prior Publication Data

US 2012/0318372 A1 Dec. 20, 2012

(51) Int. Cl.
*E03B 3/00* (2006.01)
*A62C 35/68* (2006.01)
*A62C 99/00* (2010.01)
*F16L 55/16* (2006.01)

(52) U.S. Cl.
CPC ............... *A62C 35/68* (2013.01); *A62C 99/009* (2013.01); *F16L 55/1604* (2013.01)

(58) Field of Classification Search
CPC .... F16L 55/1604; A62C 35/68; A62C 99/009
USPC ...................... 137/15.01, 15.02, 15.08, 15.09, 137/15.12–15.14, 357, 317, 318, 315.01, 137/355.12; 169/16; 138/97
See application file for complete search history.

(56) References Cited

U.S. PATENT DOCUMENTS

| | | | |
|---|---|---|---|
| 1,471,184 A | 10/1923 | Miles | |
| 1,953,671 A * | 4/1934 | Conran | ............................ 169/5 |
| 2,322,842 A | 6/1943 | French | |
| 2,543,954 A | 3/1951 | Barber | |
| 2,731,041 A | 1/1956 | Mueller | |
| 2,756,779 A | 7/1956 | Tratzik | |
| 3,298,398 A * | 1/1967 | Smith | ............................ 138/94 |
| 4,212,392 A | 7/1980 | McKenzie | |
| 4,351,349 A * | 9/1982 | Minotti | ...................... 137/15.15 |
| 4,413,655 A | 11/1983 | Brown | |
| 4,437,568 A | 3/1984 | Hamblin | |
| 4,589,446 A | 5/1986 | Allen | |
| 5,052,431 A | 10/1991 | Giles | |
| 5,058,620 A | 10/1991 | Giles | |
| 5,224,516 A | 7/1993 | McGovern | |
| 5,515,974 A | 5/1996 | Higson | |

(Continued)

OTHER PUBLICATIONS

Fire Department of New York, Standpipe Operations, DCN:4.05.04, Engine Company Operations, Chapter 9, pp. 1-9, Mar. 15, 1997.

(Continued)

*Primary Examiner* — Craig Schneider
*Assistant Examiner* — Ian Paquette
(74) *Attorney, Agent, or Firm* — Chadbourne & Parke LLP (57) ABSTRACT

Disclosed are methods and premade and/or prepositioned kits for bypassing damaged or blocked standpipes during fire or other emergencies to quickly restore water supply near the location of the fire. More specifically, an illustrative embodiment includes a method for bypassing a damaged standpipe during a fire emergency, comprising: identifying (a) the approximate location of said damage, (b) a first valve on said standpipe below said location, and (c) a second valve on said standpipe above said location; shutting the water supply to said standpipe; cutting a first section out of the standpipe immediately above said first valve, thereby leaving a first open section of standpipe above said first valve; cutting a second section out of the standpipe immediately below said second valve, thereby leaving a second open section of standpipe below said second valve; capping said first and second open sections; connecting flexible tubing from said first valve to said second valve; and restarting the water supply to said standpipe.

3 Claims, 8 Drawing Sheets

(56) References Cited

U.S. PATENT DOCUMENTS

| | | | |
|---|---|---|---|
| 5,778,919 A * | 7/1998 | Petrone | 137/15.08 |
| 5,884,760 A | 3/1999 | Carpenter | |
| 5,934,311 A * | 8/1999 | Brown | 137/240 |
| RE38,597 E | 9/2004 | Lane, Jr. | |
| 6,935,380 B2 * | 8/2005 | Rahimzadeh et al. | 138/96 R |
| 7,000,641 B2 * | 2/2006 | Welfare | 138/93 |
| 7,316,231 B2 | 1/2008 | Hickle | |
| 2006/0108241 A1 | 5/2006 | Smith | |

OTHER PUBLICATIONS

Fire Department of New York, Hydrants, DCN:4.05.02, Engine Company Operations, Chapter 6, pp. 1-7, Mar. 15, 1997.

* cited by examiner

FIG. 7: CARRYING BOX PLAN VIEW

STANDPIPE EMERGENCY BYPASS METHOD AND KIT FOR FIREFIGHTERS

FIELD OF THE INVENTION

The present invention generally relates to an emergency method and kit to bypass damaged or blocked standpipes during a fire emergency and quickly restore water supply near the location of the fire.

BACKGROUND OF THE INVENTION

As world population grows and habitable land remains fixed within urban areas, buildings are becoming taller. Firefighting in high-rise residential and commercial structures pose special challenges, and success invariably depends on the ready availability of water in the building's standpipe systems: the pipes and plumbing that are designed to provide firefighters with a reliable source of high pressure water supply for fighting a blaze inside the structure of the building.

A typical standpipe system begins with an automatic water supply, typically city main and fire pumps, or gravity-based water tanks located on the roof. At the street level there are water pipe connections for the local fire department to tap into, commonly known as the "Siamese." The Siamese connections in turn connect to pipes that run vertically and/or horizontally inside the building, and this interconnected web of plumbing eventually runs to the top of the building, and is collectively referred to as the standpipe system. A standpipe may be pressurized with water ("wet") or remain "dry" until activated in an emergency; supplied either from a fire hydrant attachment or from a pump such as a fire engine's onboard pump. Therefore standpipes are also sometimes known as "wet risers" and "dry risers" in some countries (e.g., the UK). The vertical standpipes, often painted red, are typically exposed in a building's stairwells, and there are outlet valves on each floor of the building to which firefighters can attach hoses. Water, and water pressure, is typically supplied by the city fire department. When there is a fire in a building equipped with a standpipe system, the first fire engine to arrive usually connects a hose to the nearest hydrant, and another hose to the Siamese connection in front of the building. The fire and building codes designate the number of Siamese connections required; typically about every 300 feet of building frontage requires at least one Siamese connection, and there is usually a Siamese connection for every street side on which the building has frontage space. The pump from the fire engine boosts the pressure of the water being fed from the hydrant to the Siamese connection and then to the vertical standpipe. If the building has two or more nonadjacent stairwells, each one usually has its own standpipe. The standpipes are typically all supplied with water from the same master pipe connected to the Siamese(s), so that once a fire engine is connected to the Siamese and reliably supplying it with water, firefighters can tap into any part of the standpipe network in the building to combat the fire.

A firefighting operation would be ineffective without an operational standpipe system, especially in high rise buildings and other complex structures. Without the standpipe system, the imposing height and/or large area of a structure offer only limited access by fire engines and hoses. The amount of water required to extinguish large fires in large buildings may exceed the capacity of the building's primary system, roof tanks and/or city mains, and therefore these should be augmented with pressurized water supply from fire engine(s) connected on one side to the building's standpipe system, and on the other side to another source, such as a street fire hydrant. Further, standpipe risers are increasingly used in combination with the building's emergency water sprinkler system. Failure of the standpipe riser can thus cause loss of water to the sprinkler system, thereby leading to increased risk of damage and injury. Building codes have, historically speaking, allowed for increased floor areas only because of the promise of a working sprinkler system. For example, trader floors in the New York financial district are now allowed to increase open space without limits provided they have sprinklers installed, as opposed to earlier building codes that restricted open floor space to 7,500 ft.$^2$ As a result of the new codes, the loss of the sprinklers can lead to larger uncontained fires in the larger floor areas, since there is less compartmentation from room/building walls to break or contain the fire. Such uncontrolled and free burning fires in high-rise buildings may cause abandonment of fire/rescue activities because of the fear of structural collapse of the building, and are among the most serious emergencies a fire department can attempt to mitigate. Thus, an operational standpipe system is absolutely mission-critical to fire safety.

Since firefighters rely on the standpipe system to be operable during fires and emergencies, many cities have codes and ordinances requiring maintenance of these systems in working condition. In New York City, standpipes are now mandated by code in all residential and commercial high-rises, hospitals, schools, enclosed malls, theatres, stadiums, bridges and tunnels, railway stations and the like. New York City standpipe systems must be pressure tested every five years, inspected monthly, and a record of such inspections kept by a person holding a certificate of fitness issued by the Fire Department of New York ("FDNY"). Compliance is taken so seriously that if a system is found to be out of service during working hours, the FDNY has the authority to issue a "vacate order" or mandate a "watchman's service" for the building. The watchman service requires a trained watchman to patrol all floors to detect an incipient fire, and the owner of the building will be required to pay for the cost of the Watchman system, plus fines, as an added incentive to ensure that standpipes are operational. While these legal preventive measures provide reasonable remedies to prevent standpipe systems from being compromised by either benign neglect or the negligence of building owners, they simply cannot prevent against accidents, natural disasters or intentional attacks.

Standpipe systems have been compromised both by natural causes (e.g., earthquakes), accidents, and more recently, by the rise of malignant sabotage and terrorism. Recent catastrophes, such as the World Trade Center and Pentagon explosions on Sep. 11, 2001, or the Deutsche Bank Fire on Aug. 18, 2007, have vividly shown what happens when a standpipe system is compromised. The firefighters are unable to get access to water in the upper levels of the building and are unable to repair the standpipe systems in a timely manner. As a result, many victims had no way out of the upper floors of these burning buildings, due to blocked and unprotected exits, and severed standpipe systems. Firefighters were also trapped above the fire with no water in their hoses.

Increasing the frequency of standpipe inspections, or increasing penalties for non-compliance with code requirements, also cannot ensure operating standpipes during an emergency. In this age of terrorism, faceless enemy combatants could target standpipes in their attacks. Since it is known that standpipes are critical to firefighters, enemy combatants could mount a devastating attack that seek to destroy not only a target floor(s), but also a section of the standpipe system below the target floor. A small amount of explosive placed on a standpipe riser would, unfortunately, easily sever the pipe and place the system out of service. Thus, for instance, there may be two planned explosions, one involving, say, a large explosion and fire on the 40$^{th}$ floor, and a near-simultaneous smaller explosion by a secondary device, in the stairwell of, say, the 15$^{th}$ floor to destroy the standpipe system.

In smaller buildings of less than five stories it may be possible for the fire fighters to connect extensions upon extensions to their standard issue fire hoses (typically 50' in length in New York City), and then run up the stairs to provide water at the location where the standpipe is broken. This can still be a time consuming process and a real distraction during an emergency. However, these stopgaps simply will not work in taller buildings. Having fire fighters run up ten or more stories connecting and extending hoses during a time of extreme emergency, when smoke, screams and panic fill the air of a maze-like skyscraper, is just impractical. Further, these stairways are usually cramped for space and primarily designed for egress, and any obstacles placed in the way of people running out in panic may further compromise a dire situation.

There has never been any planning or preparation done to handle such standpipe emergency situations, nor is there now. The FDNY, the largest fire department in the world, does not have specialized parts or equipment or established methods to quickly and effectively repair a damaged standpipe system, nor does any other fire department in the world known to the fire service community. The National Institute for Occupational Health and Safety (NIOSH), after its review of the Deutsche Bank Fire, made the following recommendation in August, 2010: To prepare for similar water supply issues, fire departments also need to "develop and enforce standard operating procedures to establish an alternate water supply when a high-rise building's standpipe system is inoperable." While the problem has been identified, there does not appear to be any known, publicly available, solution.

No existing methods or procedures currently followed by fire departments address the abovementioned problem. Many fire department manuals, as part of their existing standard operating procedure(s) (hereafter "SOP"), specify standpipe operations and a standpipe kit. See for instance: FIRE DEPARTMENT OF NEW YORK, Standpipe Operations, DCN:4.05.04, Engine Company Operations, Chapter 9, pp 1-9, Mar. 15, 1997 ("FDNY Manual"). However, existing SOPs focus on the task of ensuring that the fire engine is properly connected to the Siamese and building standpipe system ensuring a flow of water from the fire engine to the building. In other words, the focus of existing SOPs is external to the building; there is no SOP or pre-defined or pre-positioned kit for dealing with a non-functional or damaged standpipe inside the burning building or structure. For example, in the FDNY Manual, various types of standpipe systems and troubleshooting of typical standpipe operating issues during a fire emergency are discussed in detail. These issues include difficulties encountered with Siamese connections because of missing caps, defective threads, debris stuffed into the connection by vandals, tight caps, female swivels out-of-round, frozen female swivels, and clappers either broken or jammed open. Common operating gaffes that can cause standpipe systems to appear to malfunction—such as not ensuring that the line is charged and bled before entering the fire area, or having water blockages caused by hoses tied up in knots, or not ensuring that the pressure regulating devices ("PRDs") are either removed or fully opened—are discussed with appropriate solutions. A standpipe kit for addressing these types of issues that is external to the building is recommended by the FDNY and consists of the following: 2.5" controlling nozzle with 1.125" main stream tip and 0.5" outer stream tip; Hand control wheel(s) for outlet valve; 2.5"× 2.5" in-line pressure gauge; Pipe wrench that is at least 18" in length; Spanner wrenches; Door chocks; Special adapters such as those for connecting FDNY 2.5" hose to National Standard Thread or National Pipe Thread; and four lengths of folded 2.5" hose. However, there is no discussion anywhere in this FDNY manual/SOP of a method or kit for finding and/or repairing a damaged, blocked or otherwise sabotaged standpipe within the building during a fire emergency.

In light of the above reasons, there exists a significant and unmet need during fire emergencies for a real-time, dynamic, flexible, fast and systematic procedure to rapidly troubleshoot the cause of the lack of water supply, establish that it is in fact caused by a damaged or missing standpipe section(s), find the specific location where the standpipe(s) is compromised, and then, at least temporarily, fix the problem in the shortest time possible to secure water and extinguish the fire and/or to protect the occupants as they exit the building. A review of the prior art discussed below also indicates that there is simply no specific kit or repair system available today, or can be borrowed from other fields, to solve this urgent and very specific problem.

U.S. Pat. Nos. 2,731,041 and 2,756,779 discuss bypass assemblies for repairing, without replacement, a leaky section of a gas or water service pipe conducting fluid from a street main into a building. These patents focus on designing and implementing a built-in bypass system for the specific section where the service pipe is most likely to corrode and leak. The location of this anticipated leak is pre-determined and configured with fittings, so that when the leak occurs it is easy to set up the bypass system. However, this approach will not work for standpipe systems in fire emergencies for several reasons. First, no one can even pretend to predict which building, or which section of the standpipe within the building, would be damaged in an as yet undetermined fire emergency at an undetermined location. Therefore, if this method were to be practiced by firefighters, it would become necessary to build a bypass for the entire standpipe system in a high rise building, and do this for every high rise in the city—which is impractical for cost, space and convenience reasons. Second, even if such a backup system is built, it is also likely to be near the first system, and there is no guarantee that an explosion will not damage both the original system and the bypass.

U.S. Pat. Nos. 5,058,620 and 5,052,431 discuss a method of repairing gas pipelines which contain gas under pressure by using a complex and specialized tool to bore two holes on either side of the gas leak, creating a temporary bypass until the leak is fixed. This approach would unfortunately be too complex and time consuming to use during a life threatening fire catastrophe where time is of the utmost essence.

While the timing of any emergency is unpredictable, it is possible to prepare for them by having specialized emergency kits that handily and uniquely organize a custom collection of known components that stand ready and waiting for the time of urgent need. First aid kits and earthquake emergency kits for personal and household use are common, and many of them innovative enough to be patented. U.S. Pat. No. 5,515,974 discusses a convenient household emergency and security kit containing an array of articles such as flashlights, first aid, fire-extinguisher, and the like. There are also specialized kits that have been developed and patented for professional use, especially medicine. U.S. Pat. No. RE38,597 teaches an "IV Prep Kit" that holding essential medical devices and accessories for quickly and conveniently securing a medical device to a patient's skin or to a support during an outpatient procedure or hospital surgery. As discussed earlier with reference to the FDNY procedures, there are basic standpipe kits in the firefighter trade to fix minor issues in the standpipes that are external to the building, but there is no specialized kit available for quick and convenient emergency repair of standpipes within burning buildings.

In conclusion, there is no known procedure or method available to professional firefighters that can be used, during a fire emergency, to quickly, efficiently and systematically identify if the burning building's standpipe system has been internally damaged, blocked, sabotaged or compromised in any way. Further, even if the firefighter happens to find the location of a damaged or blocked standpipe by a visual inspection, the firefighter still has no easy and convenient method, nor a customized handy emergency kit, to quickly resolve the problem and focus on the job of putting out the fire as quickly as possible and saving lives.

DETAILED DESCRIPTION

Illustrative and alternative embodiments and operational details of emergency standpipe bypass methods and kits for use by firefighters to quickly and efficiently bypass damaged/blocked standpipe sections during fire emergencies in buildings (and other steel/iron/concrete structures) equipped with standpipe (or similar piped water supply) systems, are detailed below with reference to the figures provided.

Figure 1:
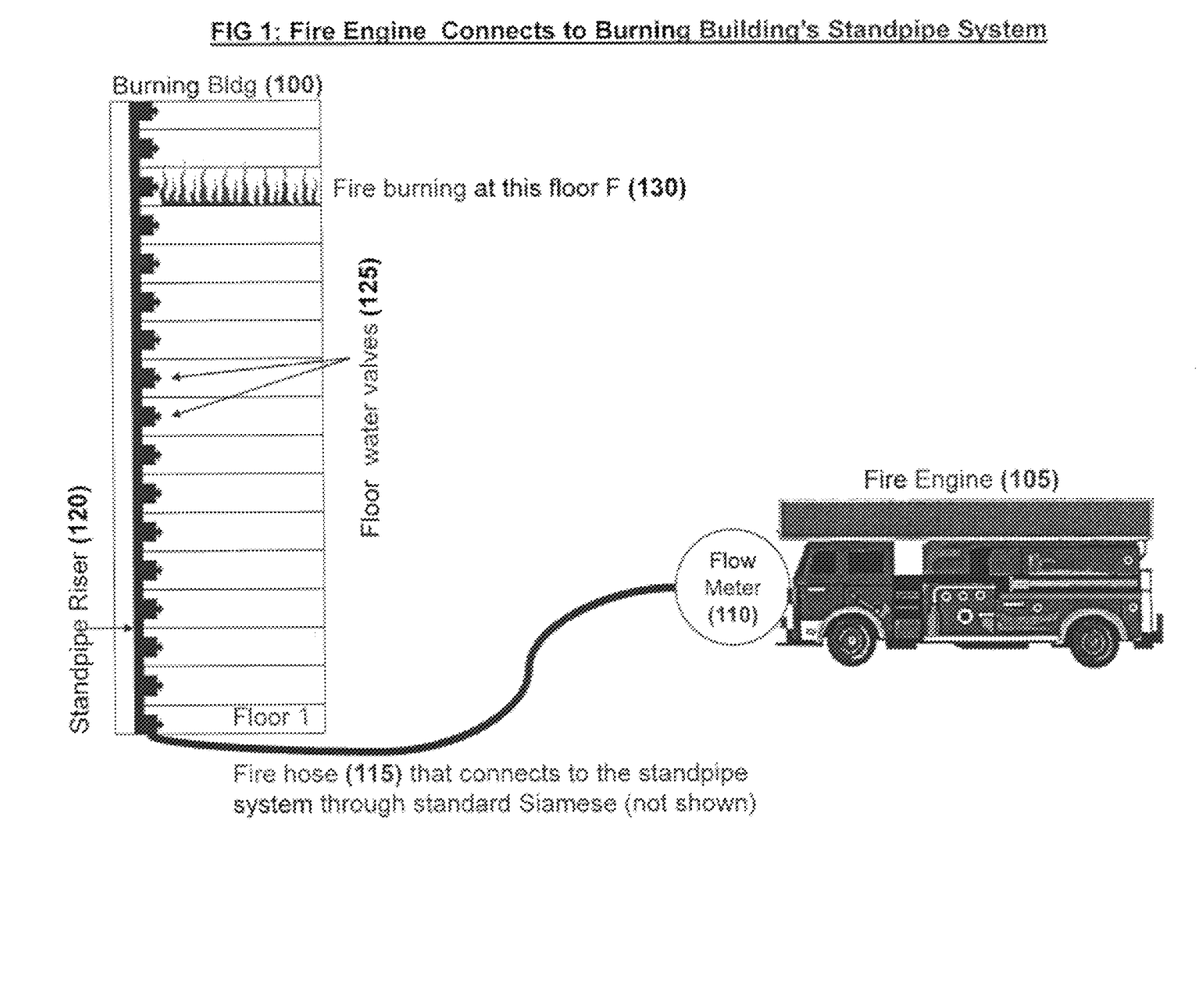
FIG. 1 is a general representation of a fire engine stationed at the scene of a fire emergency where the fire hose has been connected to the building's standpipe system.

FIG. 1 is a schematic showing a high-rise building (100) that has a fire burning on floor F (130). The building has a typical standpipe system with standpipe risers (120) that go from Floor 1 to the top, with floor valves at each floor level (125). Many of these buildings may also have basements and cellars that have riser control valves that are connected to the standpipe system, and while these are not depicted here, they are well known to firefighters skilled in the profession. The Fire Engine (105) has already arrived at the scene of the emergency, and the firefighters have connected the hose (115) from the Fire engine to the building's standpipe system (120) through the most convenient Siamese (not shown).

Figure 2:
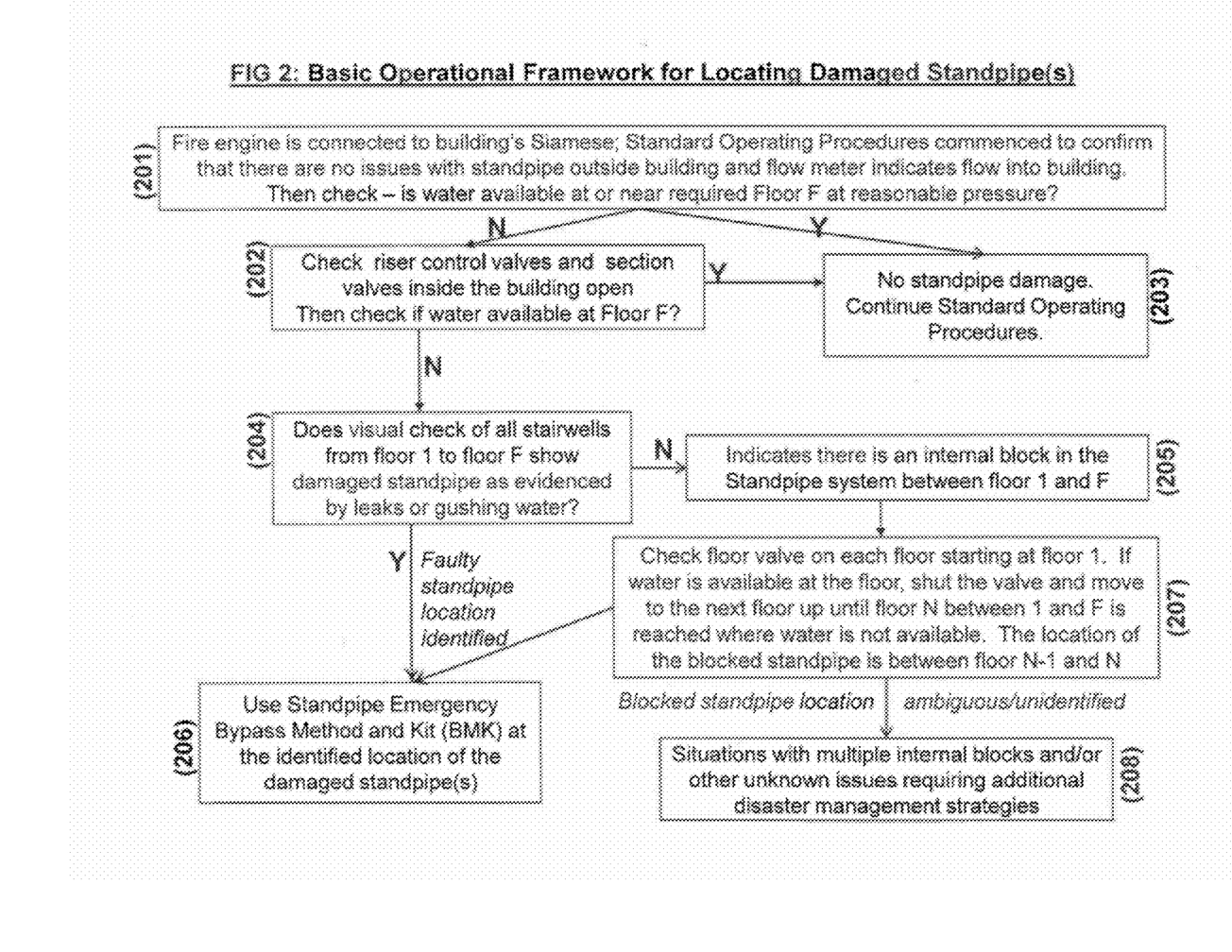
FIG. 2 is a block diagram that illustrates an operational framework for investigating if a section of the standpipe in the burning building is damaged or blocked, and then also locating the specific section where the standpipe(s) is damaged, as an illustrative embodiment of the present invention.

FIG. 2 is a basic operational framework for identifying and locating a damaged standpipe, according to one illustrative embodiment of the present invention. It is emphasized at the outset that while the blocks of operation are illustrated in FIG. 2 as appearing in sequence, some blocks can be interchanged and/or conducted in parallel with other blocks by multiple firefighters to expedite the process, as will be apparent to experienced firefighters. For example, blocks (201), (202) and (204) can easily be conducted in parallel. In operations block (201), commonly existing methods used by fire departments worldwide as part of their SOPs are implemented to establish that there is water flowing from the Fire Engine (105) to the standpipe system of the building, as evidenced by a proper indication of water flow on the Fire Engine's flow meter (110). This has already been discussed earlier in the background section of this document. The final action in this block (201) is to see if water is available at or near the burning floor F at sufficient pressure. If water is available, there is no blocked standpipe system inside the burning building and the firefighters can continue with their well-established SOP (203). If water is not available, then the next step is to do some additional checks outlined in block (202).

In (202), the firefighters check the inside of the building initially for the simpler issues. If the building has a basement(s) or cellar(s), a check of the riser control valve and (if present) section valves are conducted to ensure that these valves are operational. If this resolves the problem, and water is now available in Floor F, then there is no blocked standpipe inside the burning building and the firefighters can continue with their well-established SOPs (203). However, if there is still no water available at Floor F, then firefighters run up from Floor 1 to Floor F to check each floor valve(s) to ensure that there are no open floor valve(s) leaking water below Floor F (204). While running up and checking that each floor valve up to Floor F is closed, they also visually inspect the stairwells (and listen for sounds of running water) to quickly find obviously damaged or leaky standpipe(s), often evidenced by flowing water in the stairwells or along the building walls, that can then be traced to the approximate location (within one or two floors) of the leaking or breached standpipe. Once the breach is identified, then the Standpipe Emergency Bypass Method and Kit ("BMK"), an illustrative embodiment of the invention, can be implemented (206), and as will be explained in greater detail infra. Thus, when there is a major water break, the broken standpipe might be easily seen or heard, and BMK can be implemented immediately.

In the operations of block (204) described in the above paragraph, if it is found that the floor valves between Floors 1 and Floor F-1 are all closed and there is still no water available at Floor F, and there is no obviously visible or audible water leak to be found, then that indicates an internal block or obstruction within the standpipe system somewhere between Floor 1 and Floor F (205). The next step is to check each floor valve beginning at Floor 1—this time to see if water actually begins to come out when it is being opened. If water comes out in Floor 1, then close the valve on Floor 1 and move to Floor 2 and repeat the same step. If water does not come out at Floor 2, then it is apparent that the internal obstruction has been identified to be between Floor 1 and Floor 2, and BMK (206), can be implemented. If water is available at Floor 2, then it is also clear that the obstruction is between Floor 2 and Floor F, and the steps above can be repeated from Floor 2 to 3, then 3 to 4, etc., until Floor N (between Floor F and 1) is reached where water is not available, in which case the obstruction is between Floor N and N-1, and again BMK (206) can be implemented at this location.

It will be apparent to one skilled in the art that there are many possible variations, both in terms of operating sequences and blockage scenarios. In fact, a more efficient way to search for internal blocks may be to start the process of checking Floor valves in Floor F-1 instead of Floor 1. This way, the location of breach is identified from top down (Floor F to Floor 1), rather than from the bottom up, since Floor F is where the fire is. Depending on the number of professional firefighters available at the scene of emergency, the height of the building, and complexity of operations, it may also be possible to do both—i.e., check from the bottom while simultaneously checking from the top, and this is a preferred embodiment. Further, for a very tall building, say 100 floors with a fire burning on floor 90, the checks can start at different intermediate levels—say floor 1, floor 30, floor 60 and floor 89, working both up and down from each of these intermediate levels.

The teachings herein can also be applied to more advanced and complicated standpipe breaches than are described above, even when the identification of the exact locations of the breached/blocked standpipes is more difficult. As an example, consider a situation where there is an internal block in the standpipe near two locations, Floor N and Floor M, where both N and M are between Floor 1 and Floor F (where the fire is burning), and N is below M. In this situation, gravitational force dictates that N must be found and fixed first, before M can. But the same principles discussed above can be applied to identify the block near N, followed by fixing N using BMK so that water is now available to Floor N; and then finding the next block near M, and then again fixing it using BMK to restore water to Floor F. However, if a substantial number of different locations within the standpipe riser are simultaneously breached and/or there are other unforeseen issues (e.g., a complete stoppage of the municipal water supply), then other disaster management methods may be necessary (208), if they are available.

Figure 3:
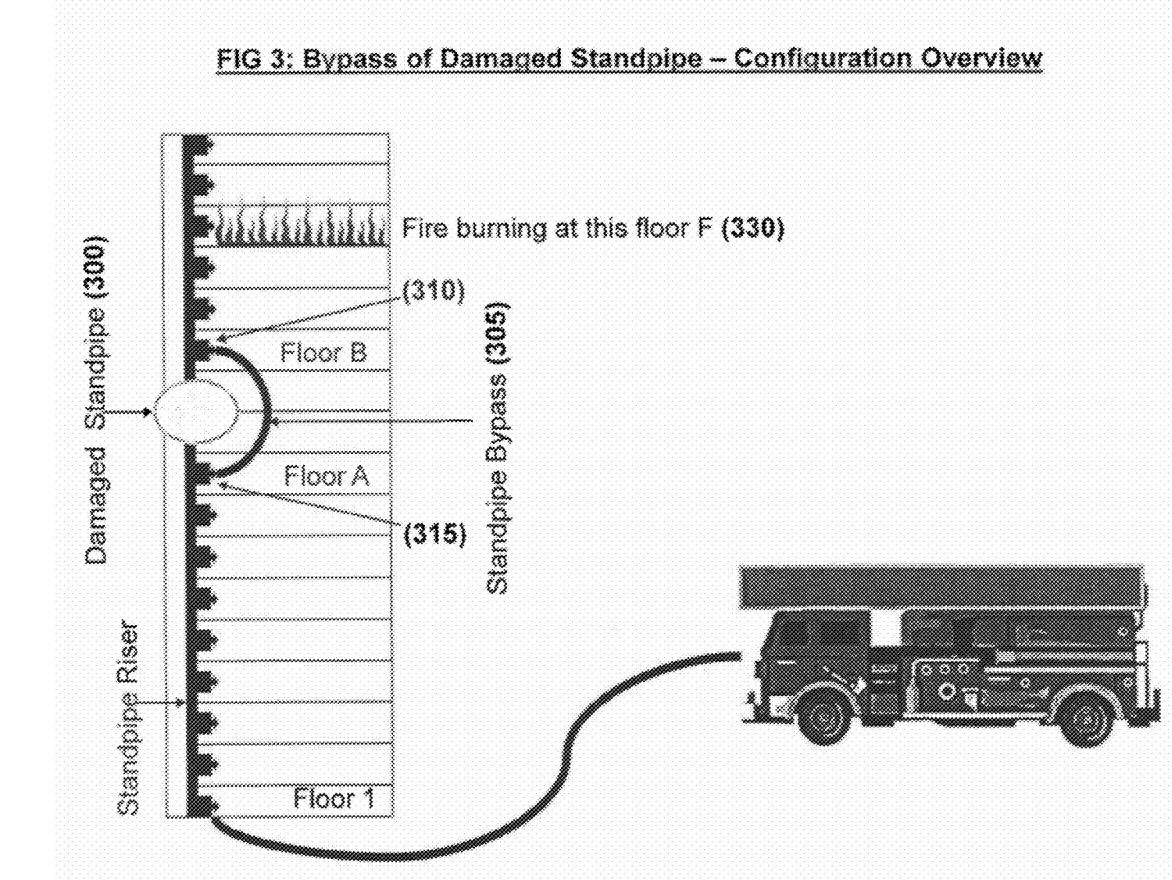
FIG. 3 is an overview of the emergency bypass method of the identified damaged section of the standpipe, in an illustrative embodiment of the present invention.

FIG. 3 shows an overview of the method for temporarily bypassing a damaged standpipe (300) located between Floor A and Floor B, below the burning floor (F). In a nutshell, the method involves (1) isolating/capping the standpipe at two points, one below the damaged section (300) but above the closest operational floor valve (315), and the other above the damaged section (300) but below the closest operational floor valve (310); and (2) setting up a temporary standpipe bypass (305). This is explained in more detail below with reference to the illustrations in FIG. 4 and the high level methodology outlined in the block diagram of FIG. 5.

Figure 4A:
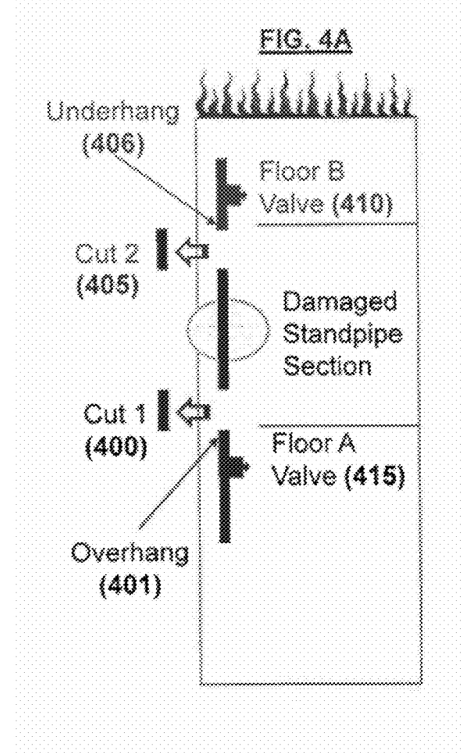
FIG. 4 details the three key steps involved in establishing the emergency bypass of FIG. 3, in an illustrative embodiment of the present invention.
Figure 4B:
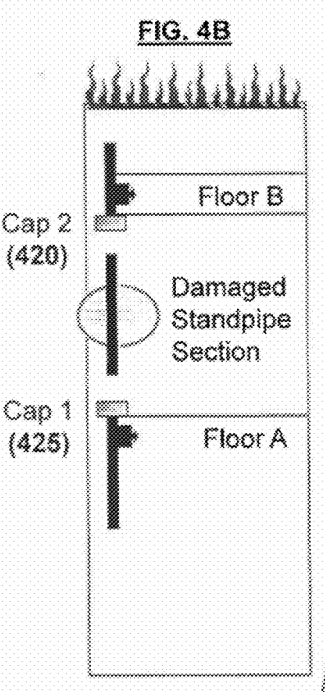
Figure 4C:
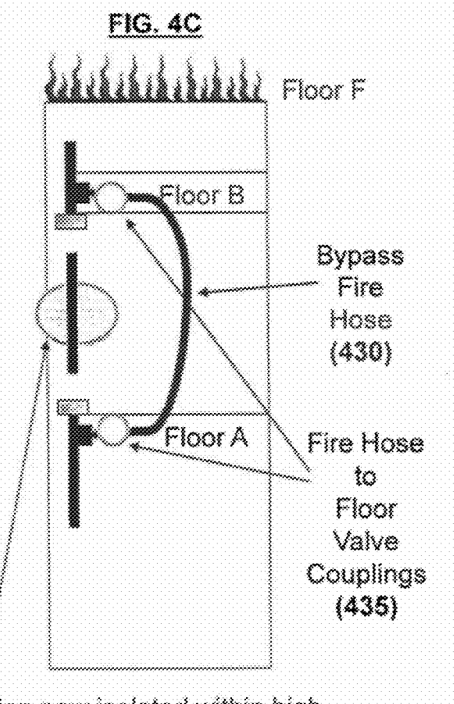
Figure 5:
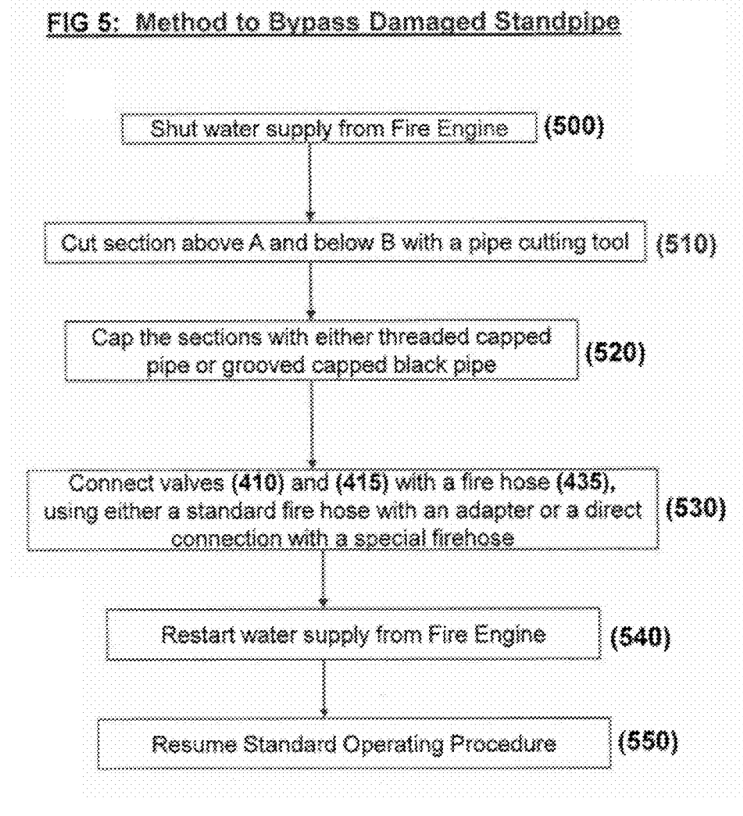
FIG. 5 is a block diagram that illustrates a method of implementing the emergency bypass system, as an illustrative embodiment of the present invention.

As a first step (FIG. 5), the water supply from the Fire Engine is shut off (500). Then (510 and 520) a piece of the standpipe above floor valve (415) is cut out (400) and capped (425). This would basically stop the flow of water at the cap and, at a minimum, water would now be available to this height (Floor A). (The cutting and capping process is also described in more detail infra.) Next, a cut (405) is made below Floor valve (410) and a section of the standpipe here is also removed and capped (420). These cutting/capping steps can occur in parallel to minimize time. Then a flexible fire hose (430) is connected as a bypass from Floor A to Floor B, so that standpipe pressure is now available above Floor B and thereon to Floor F where it is urgently needed (530). Depending on the diameter of the floor valve outlet and the type of fire hoses that are used, an appropriate adapter (435) may be required to couple the floor valves (410 and 415) to the bypass fire hose (430). The water supply is restarted from the Fire Engine (540) and Standard Firefighting Operations can resume (550) since water is now available through the standpipe bypass (430) all the way up to Floor F. With specially trained firefighting teams for this operation (preferably one 2-person team working above the damaged standpipe and other 2-person team working simultaneously below, the standpipe system could be back in full operation within 20 minutes or less, allowing hose lines to be stretched and operated on all floors other than the damaged section. The damaged area, if it is burning, could also be extinguished with hose lines stretched from the lower or upper areas. Note that while the preferred method of shutting and restarting the water supply to set up the emergency bypass is by radio communications with the Fire Engine operator, it is also possible to accomplish this by closing and opening the riser control valve(s) in the building.

A specialized, ready-to-use emergency bypass/repair kit that stands waiting to support the specialized standpipe emergency bypass repair methods described above (hereafter a "Standpipe Bypass Kit" or "SBK") can be developed by carefully selecting specific tools and specific components/hardware from a vast multitude of hardware and plumbing options, as a designed field solution for the specific problem at hand. The tools and hardware in the SBK should also be selected based on compliance with building and fire department codes of the region, and consideration should also be given to ergonomic requirements in an emergency, such as minimization of the weight of the kit so that the carrying burden on firefighters is minimized. An embodiment of the invention with reference to the requirements of the City of New York is illustrated next.

Starting with the standpipe cutting process, in a preferred embodiment, a reciprocating saw with a fire/rescue blade is used to quickly and easily cut through this pipe as there is only a need to cut, and there is less concern about the angle or straightness of the cut. However, any pipe cutting tool such as a pipe cutting wrench could also serve the same purpose. The cutting and capping process, and the preferred tools used to accomplish it quickly and efficiently, depend heavily on the region and its building and fire safety codes. In New York, there are at least two types of piping used in standpipe construction; threaded pipe found in older construction, and grooved pipe (e.g., Victaulic®), found in newer construction; both familiar to firefighters and plumbers skilled in the art. The grooved connections are essentially clamps placed at the end of steel pipe. If the standpipe system is based on the older threaded pipe, then the first step is to cut out two sections of the standpipe (400 and 405), each typically 12-18", within about a foot of the two nearest floor valves (415 and 410) and then discard these sections. This provides room for maneuverability for the next capping step. Next the overhang (401) and underhang (406) sections of the standpipe from the cut to the floor valve are removed by screwing each of them out, using a compound pipe wrench for convenience and leverage. The last step to complete the capping process is to screw in two new capped pipes of the same nominal diameter as the standpipe on to the floor valve (415 and 410). It would be an imperative, in a preferred embodiment, to have this threaded capped pipe ready and available in the SBK since the process of threading a pipe would otherwise require additional waste of time.

If instead there is a newer grooved or Victaulic® connection, or the like, it should be cut and removed by loosening the coupling near the valve (415 and 410), removing the cut pipe overhang and underhang (401 and 406), and inserting a new capped pipe. Typically this is done by loosening only two hex nuts with a socket wrench, replacing the pipe and tightening the fitting. This is by far an easier and quicker operation, designed for expediency and efficiency in the building trade. However, in New York City, both types of standpipes exist, so the SBK should contain both types of fittings. Depending on the specifications of the standpipes found in the buildings in a particular region the SBK can be adapted/customized for easy emergency use based on the teachings contained herein.

The FDNY typically uses hoses in 50' lengths. The hose comes in various diameters depending on need. The FDNY usually uses 3.5" hose with 3" fittings to supply standpipe and sprinkler Siamese(s), and 2.5" hose for firefighting in high-rise buildings. However, floor outlet valves in New York buildings typically have 2.5" diameters with male threads. Depending on the type of hose used to create the bypass, adapters may be needed before the floor outlet valves at A and B can be connected to the bypass hose (430). A typical 50' hose would need to be fed into the outlet valve using FDNY fittings which are a reducer fitting (3" to 2.5") and a double female fitting (2.5") on one end and an expander (2.5" to 3') on the other. Since time is critical, a preferred embodiment would be to have a specially designed flexible high pressure fire hose for the bypass connection between Floor A and Floor B that is made without the fittings and adapters (435). So, in this preferred embodiment as applied to FDNY using their latest fire and building codes, a special, high pressure, 3.5" hose with 2.5" "female" connections on both ends can be made to directly connect both "male" outlet valves without the use of any fittings. Since the hose comes in lengths of 50', it should generally be sufficient to cover a height of about 4 floors and will likely serve most applications. However, for sections involving larger damage to the standpipes, or damages at multiple locations, the hoses can be extended easily using conventional extension adapters, or a 100' hose could also be made with the same fittings. Therefore it is generally advisable to have at least 4 bypass hoses in each SBK. It would also be preferable to color this hose red so as to distinguish it from the normal 50' hose and eliminate potential confusion on the ground by firefighters.

Figure 6:
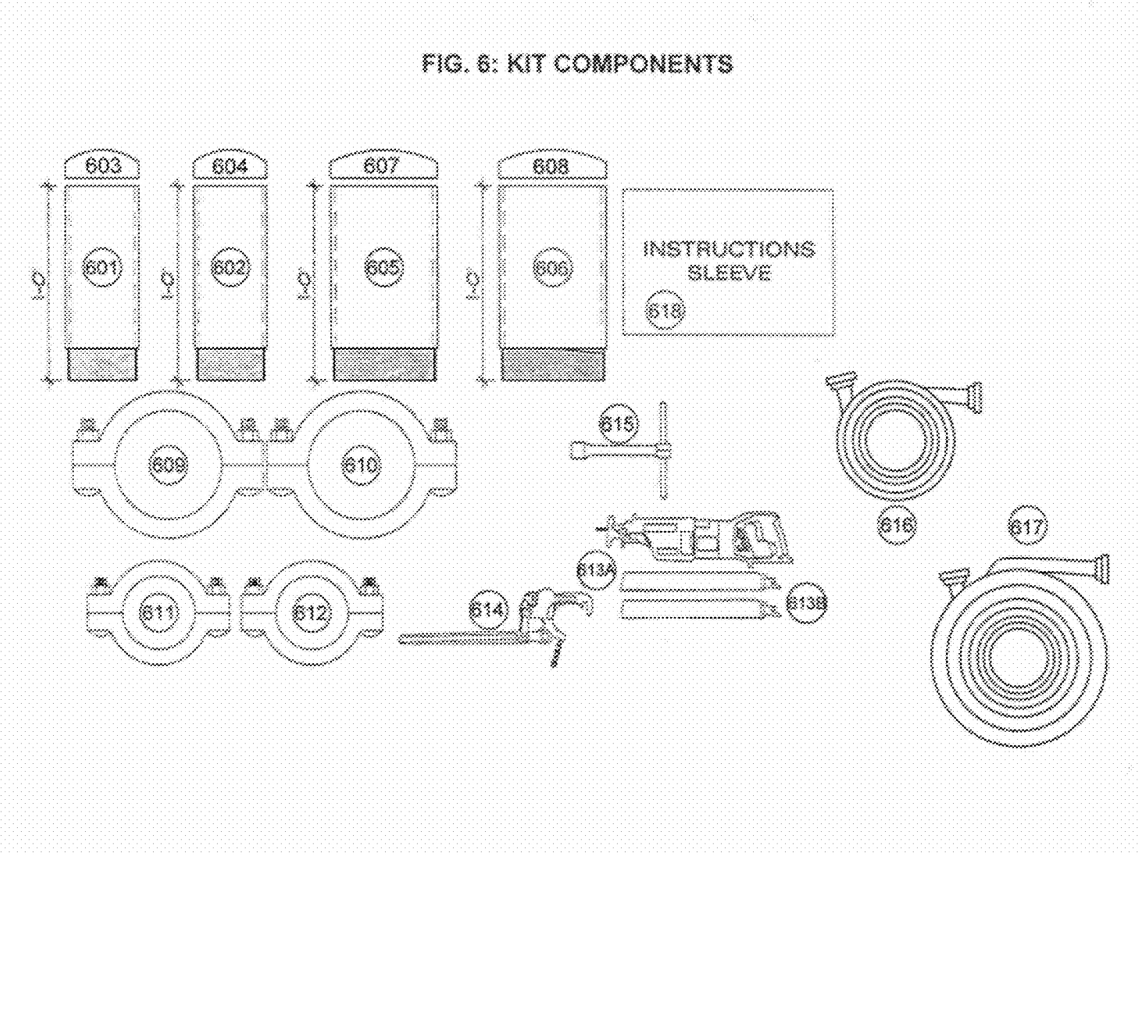
FIG. 6 shows equipment and materials to be used in a standpipe emergency bypass kit, as an illustrative embodiment of the present invention.

Based on current fire department and building codes in the New York City, and the discussion above, the standpipe bypass kit, in a preferred embodiment of the invention, would include the following tools or their equivalents (see FIG. 6):

1. Compound leverage wrench for pipe sizes up to 6 inch (614)
2. Pipe cutting tool, preferably a reciprocating saw with a fire/rescue or destructor blade (613A), with a few spare fire/rescue blades (613B) in case of breakage.
3. Ratchet wrench with appropriate sockets for grooved or Victaulic® couplings (615)
4. Two twelve inch pieces of 4" diameter steel pipe (601, 602), threaded on one end and securely capped (603, 604) on the other.
5. Two twelve inch pieces of 6" diameter steel pipe (605, 606), threaded on one end and securely capped (607, 608) on the other.
6. Two twelve inch pieces of 4" grooved capped black pipe for a grooved or Victaulic® connection (611, 612).
7. Two twelve inch pieces of 6" grooved capped black pipe for a grooved or Victaulic® connection (609, 610).
8. One 50' length high pressure hose with female connections on both ends (616), and another that is 100' in length (617), both of which can directly connect to a standard floor outlet valve. (While standard issue FDNY (3.5") hose—with a male connection at one end and a female connection at the other—can also be used, they are less efficient because it would be necessary to have the requisite adapters and reducers to connect it to the 2 male outlets of the 2 floor valves).
9. Instructions for implementing the bypass/repair, formatted for easy visibility and reference, preferably on waterproof, laminated cards or plastic (618).

Figure 7:
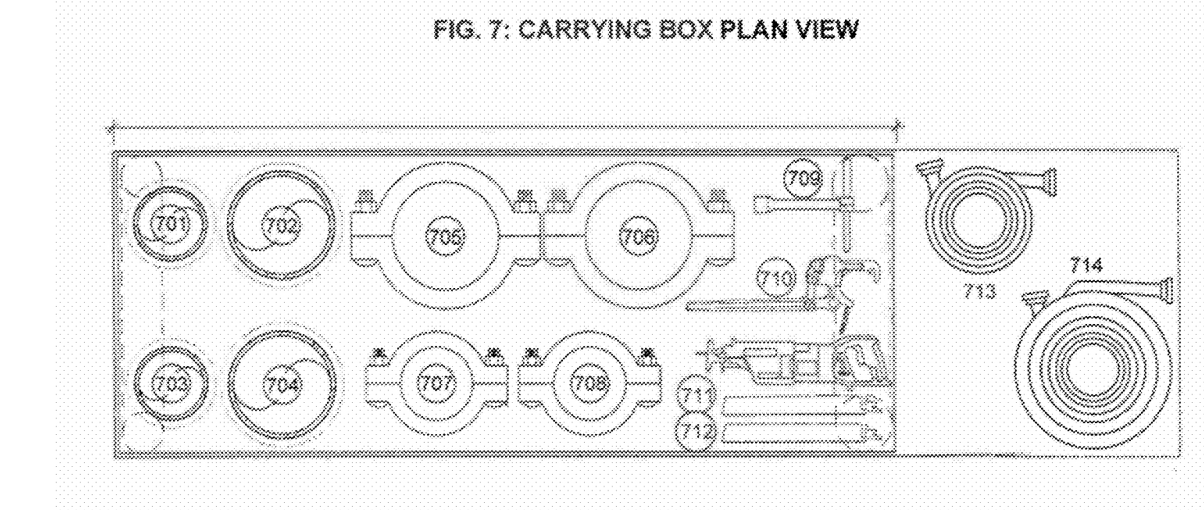
FIG. 7 shows the plan view of the equipment and materials of FIG. 6 organized in a carrying box, as an illustrative embodiment of the present invention.
Figures 8, 9:
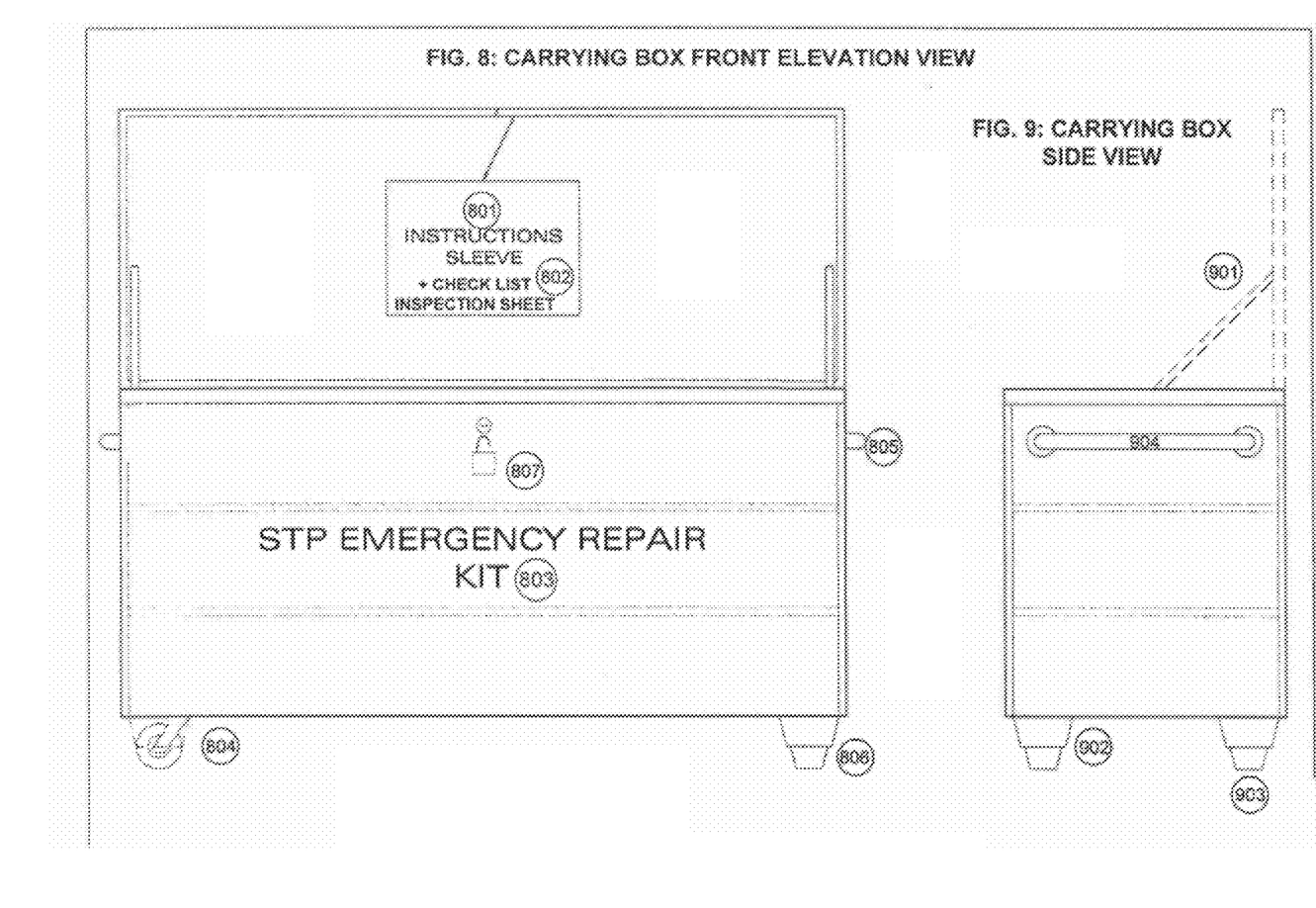
FIG. 8 and FIG. 9 show front elevation and side elevation views, respectively, of the carrying box shown in FIG. 7, as an illustrative embodiment of the present invention.

All these items above would be arranged and stored in any spatially efficient and ergonomic manner within a strong wheeled metal box or equivalent convenient and hardy carrying/transporting device/package, as shown in FIG. 7-9. Preferably the kit would also be painted red and marked "STP Emergency Bypass Kit," and the bypass hoses would be colored red to distinguish it from other firefighting hoses.

While a 50' ft bypass hose is described above, the minimum length of the hose required can be calculated on the basis of a unitary breach between the floors of a high-rise, which typically has a minimum floor height ranging from 10-15' and, according to international building codes, has a stairwell that is roughly 3' wide. Thus the bypass hose should snake from one floor valve to the next through this slanted stairwell and, from basic geometry, the minimum distance of the bypass hose should be approximately within $(3^2+(10)^2)^{1/2}$ to $(3^2+(15)^2)^{1/2}$, or about 10.5' to 15.3'. It is also noted that a kit designed for a specific property and housed at that property would not require as many pipe fittings or components since it is standardized to the fittings of that specific property. For example, if the building has older threaded pipe, only threaded fittings and tools are needed for the SBK resident at that building site.

The BMK/SBK methods and kits described herein could easily be implemented with a small amount of training and minimal incremental cost for professional firefighters or modern volunteer departments. As will be readily apparent to one skilled in the art, the type of tools used, and the general dimensions of the tools and pipes discussed above for the FDNY, can be modified for any similar application in other cities, counties and states, and countries outside the US, based on the specific building and fire codes, and the types of standpipe or other water supply systems used in fire emergencies, that are customary to those regions. Though the descriptions herein were primarily with reference to high-rise buildings, the teachings are equally applicable to other steel/iron and concrete structures such as bridges, tunnels, shopping malls, stadiums, etc. For example, New York City tunnels and bridges have Siamese connections at either ends of the bridge for the Fire Engine to connect to, and there is a standpipe that runs by the side of the bridge/tunnel with floor valves placed periodically on the standpipe, and the emergency operations are similar.

Forward-thinking, vigilant fire departments and urban planners should also consider holistic, city-wide or county-wide approach to address any compromises to the standpipe system. Local fire departments should train their special operations command units (High-rise Unit, Collapse Unit, Rescue, and Squad companies etc.) with the standpipe emergency bypass procedures and the use of the Standpipe Emergency Bypass Kit. Fire departments that are not as large can have their Rescue units or Utility units carry this Kit. Eventually, as part of the city codes and ordinances an onsite kit (customized for the pipe connections used on the specific property) is recommended, particularly in the larger and/or more high profile buildings such as, but not limited to, the UN Building, Grand Central Terminal, Rockefeller Center, Citicorp, Empire State Building, Federal Buildings, large hotels, underwater tunnels, etc. Otherwise, emergency services may be overwhelmed during the first few hours of such an event, when such equipment would be at a premium.

While the invention has been described in conjunction with specific embodiments, it is evident that many alternatives, modifications, permutations and variations will become apparent to those skilled in the art in light of the foregoing description. Accordingly, it is intended that the present invention embraces all such alternatives, modifications and variations as fall within the scope of the claims below.

What is claimed is:

1. A method for bypassing a damaged standpipe during a fire emergency, comprising:
   identifying (a) the approximate location of the damage, (b) a first valve on the standpipe below the location, and (c) a second valve on the standpipe above the location, wherein the standpipe is of threaded pipe construction;
   shutting the water supply to the standpipe;
   cutting a first section out of the standpipe immediately above the first valve, thereby opening a first section of standpipe above the first valve;
   cutting a second section out of the standpipe immediately below the second valve, thereby opening a second section of standpipe below the second valve;
   capping the first and second open sections by (a) disconnecting the open sections from the first and second valves, and (b) connecting new first and second pre-prepared threaded capped pipes of the same nominal diameter as the standpipe into the first and second valves
   connecting a pre-determined section of flexible tubing between the first valve and the second valve; and
   restarting the water supply to the standpipe.

2. A method for bypassing a damaged standpipe during a fire emergency, comprising:
   identifying (a) the approximate location of the damage, (b) a first valve on the standpipe below the location, and (c) a second valve on the standpipe above the location, wherein the standpipe is of grooved pipe construction;
   shutting the water supply to the standpipe;
   cutting a first section out of the standpipe immediately above the first valve, thereby opening a first section of standpipe above the first valve;
   cutting a second section out of the standpipe immediately below the second valve, thereby opening a second section of standpipe below the second valve;
   capping the first and second open sections by loosening first and second couplings that connect the first and second valves to the first and second sections, removing the sections, inserting new first and second pre-existing grooved capped pipes of the same nominal diameter as the standpipe into the first and second valves, and tightening the first and second couplings;
   connecting a pre-determined section of flexible tubing between the first valve and the second valve; and
   restarting the water supply to the standpipe.

3. method for bypassing a damaged standpipe during a fire emergency, comprising:
   identifying (a) the approximate location of the damage, (b) a first valve on the standpipe below the location, and (c) a second valve on the standpipe above the location, wherein the standpipe is of grooved pipe construction;
   shutting the water supply to the standpipe;
   cutting a first section out of the standpipe immediately above the first valve, thereby opening a first section of standpipe above the first valve;
   cutting a second section out of the standpipe immediately below the second valve, thereby opening a second section of standpipe below the second valve;
   capping the first and second open sections by (a) loosening a second coupling that connects the second valve to the second open section, (b) removing the second open section, (c) inserting a new pre-supplied grooved capped pipe of the same nominal diameter as the standpipe into the second valve, and (d) tightening the second coupling;
   connecting a pre-determined section of flexible tubing between the first valve and the second valve; and
   restarting the water supply to the standpipe.

* * * * *